(12) United States Patent
Roh et al.

(10) Patent No.: US 8,650,388 B2
(45) Date of Patent: *Feb. 11, 2014

(54) MULTI-PROCESSOR SYSTEMS AND BOOTING METHODS THEREOF

(75) Inventors: Jong-Ho Roh, Suwon-si (KR); Min-Soo Lim, Suwon-si (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 133 days.

This patent is subject to a terminal disclaimer.

(21) Appl. No.: 13/064,200

(22) Filed: Mar. 10, 2011

(65) Prior Publication Data

US 2011/0167253 A1    Jul. 7, 2011

Related U.S. Application Data

(63) Continuation of application No. 11/704,202, filed on Feb. 9, 2007, now Pat. No. 7,930,530.

(30) Foreign Application Priority Data

Feb. 15, 2006   (KR) .................. 10-2006-0014787

(51) Int. Cl.
    *G06F 9/00*    (2006.01)
(52) U.S. Cl.
    USPC .............................................. 713/2; 711/103

(58) Field of Classification Search
    USPC .............................................. 713/2; 711/103
    See application file for complete search history.

(56) References Cited

U.S. PATENT DOCUMENTS

| 7,028,176 B2 | 4/2006 | Aspegren |
| 7,032,106 B2 | 4/2006 | Horanzy et al. |
| 7,290,080 B2 | 10/2007 | Patel |
| 7,475,184 B2 | 1/2009 | Lee |

FOREIGN PATENT DOCUMENTS

| JP | 08-161283 | 6/1996 |
| JP | 2000-305912 | 11/2000 |
| JP | 2001-154849 | 6/2001 |
| KR | 10-1997-0006412 | 4/1997 |
| KR | 10-2003-0074106 | 9/2003 |

*Primary Examiner* — Albert Wang
(74) *Attorney, Agent, or Firm* — F. Chau & Associates, LLC

(57) ABSTRACT

Multi-processor systems and methods thereof are provided. In an example, the multi-processor system may include a boot memory including a plurality of boot codes, each of the plurality of boot codes configured to facilitate an initialization process at one of a plurality of intellectual property (IP) blocks, each of the plurality of IP blocks having shared access to the boot memory. In another example, the multi-processor system may receive, from a first processor, a request to provide one of a plurality of boot codes from a boot memory, the received request sent in response to a system initializing signal, may read the requested boot code from the boot memory and may transfer, from a second processor, the read boot code to the first processor.

25 Claims, 5 Drawing Sheets

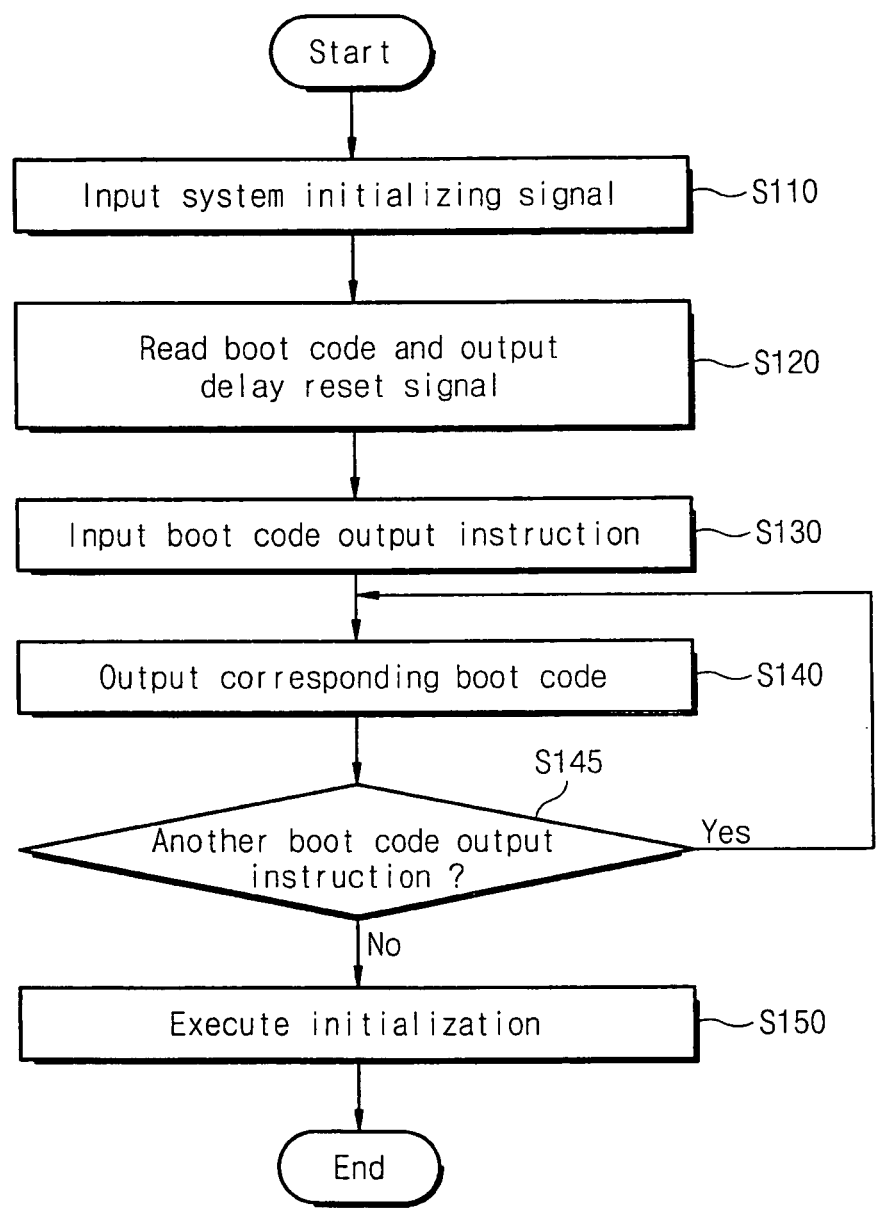

MULTI-PROCESSOR SYSTEMS AND BOOTING METHODS THEREOF

PRIORITY STATEMENT

This application is a continuation of U.S. application Ser. No. 11/704,202 filed Feb. 9, 2007 now U.S. Pat. No. 7,930,530, which claims priority under 35 U.S.C. §119 of Korean Patent Application No. 2006-14787, filed on Feb. 15, 2006, the entire contents of each of which are hereby incorporated by reference.

BACKGROUND OF THE INVENTION

1. Field of the Invention

Example embodiments of the present invention relate generally to multi-processor systems and methods thereof, and more particularly to multi-processor systems and methods of initializing said multi-processor systems.

2. Description of the Related Art

A conventional mobile device, such as a personal digital assistant (PDA), may include a plurality of processors to support multiple functions. If the mobile device is turned on, each processor within a given intellectual property (IP) block may execute a program (e.g., a "boot code") to initialize the respective IP block. Generally, a system initializing operation may check a custom setting (e.g., a complementary metal oxide semiconductor (CMOS) check), and may load an interrupt handler and device drivers. Additionally, the system initializing operation may initialize registers and device management, and may perform a power-on-self-test (POST) for components in each IP block, as well as peripheral devices.

The boot code may typically be stored in a read only memory (ROM), an erasable programmable read-only memory (EPROM) or NOR flash memory. If the boot code is stored in the ROM or the EPROM, it may be difficult to modify or refresh the boot code (e.g., because the memory is read-only). Alternatively, if the NOR flash memory is used as a storage medium for a basic input/output system (BIOS) program or boot code, the boot code may be more easily modified or erased.

FIG. 1 is a block diagram of a conventional multi-processor system. Referring to FIG. 1, the multi-processor system may include IP blocks 10, 30 and 50 connected through a system bus 60. In an example, the IP blocks 10, 30 and 50 may be embodied as a semiconductor circuit, a module and a block, respectively, with each IP block having a given function.

Referring to FIG. 1, processors 11 and 13 may utilize NOR flash memories 15 and 35 as a storage medium (e.g., a boot memory) of a BIOS program (e.g., the boot code). The respective processors 11 and 31 in the IP blocks 10 and 30 may utilize dynamic random access memories (DRAMs) 13 and 33 as a system memory. The respective processors 11 and 31 in the IP blocks 10 and 30, DRAMs 13 and 33, and NOR flash memories 15 and 35 may be connected through local buses LB1 and LB2, respectively. Each of the IP blocks 10 and 30 may further include additional peripheral devices 17 and 37, respectively.

As described above, the NOR flash memory 15 and 35 may allow the stored program to be easily modified or refreshed. However, NOR flash memory devices may be more expensive than, for example, ROM and/or EPROM devices. Also, NOR flash memory devices may have a relatively large physical size, such that a NOR flash memory device with a capacity for storing a given amount of data may be bigger than a corresponding ROM and/or EPROM device with the same storage capacity.

As illustrated in FIG. 1, if a plurality of processors includes respective boot memories implemented with a NOR flash memory, the manufacturing cost and the size may be higher. In mobile devices, physical size and manufacturing cost may be important design criteria, such that the deployment of NOR flash memory to store boot codes may make it more difficult to cheaply manufacture a relatively small-sized and multi-functional mobile device, while deploying ROM and/or EPROM memory to store boot codes may reduce the functionality of the mobile device.

SUMMARY OF THE INVENTION

An example embodiment of the present invention is directed to a multi-processor system, including a first intellectual property (IP) block including a first processor, the first IP block including a boot memory storing a plurality of boot codes, each of the plurality of boot codes configured to initialize one of a plurality of IP blocks, the plurality of IP blocks including shared access to the boot memory via the first IP block.

Another example embodiment of the present invention is directed to a multi-processor system, including a boot memory storing a boot code, a first processor generating a control instruction for receiving the boot code in response to a system initializing signal and a second processor receiving the generated control instruction from the first processor, the second processor reading the boot code from the boot memory in response to the system initializing signal, and outputting the read boot code in response to the control instruction.

Another example embodiment of the present invention is directed to a method for performing an initialization operation within a multi-processor system, including receiving, from a first processor, a request to provide one of a plurality of boot codes from a boot memory, the received request sent in response to a system initializing signal, reading the requested boot code from the boot memory and transferring, from a second processor, the read boot code to the first processor.

Another example embodiment of the present invention is directed to a multi-processor system, including a boot memory including a plurality of boot codes, each of the plurality of boot codes configured to facilitate an initialization process at one of a plurality of intellectual property (IP) blocks, each of the plurality of IP blocks having shared access to the boot memory.

Another example embodiment of the present invention is directed to a method for operating a multi-processor system, including storing a plurality of boot codes within a boot memory, each of the plurality of boot codes configured to facilitate an initialization process at one of a plurality of intellectual property (IP) blocks, each of the plurality of IP blocks having shared access to the boot memory.

Another example embodiment of the present invention is directed to a multi-processor system suitable for a small-sized and multi-functional mobile device, and a method for initializing the same.

Another example embodiment of the present invention is directed to a multi-processor system using a NAND flash memory as a boot memory.

BRIEF DESCRIPTION OF THE DRAWINGS

The accompanying drawings are included to provide a further understanding of the invention, and are incorporated in and constitute a part of this specification. The drawings illustrate example embodiments of the present invention and, together with the description, serve to explain principles of the present invention.

FIG. 5 is a flowchart illustrating operations performed by the multi-processor system of FIG. 4 according to another example embodiment of the present invention.

DETAILED DESCRIPTION OF EXAMPLE EMBODIMENTS

Figure 1:
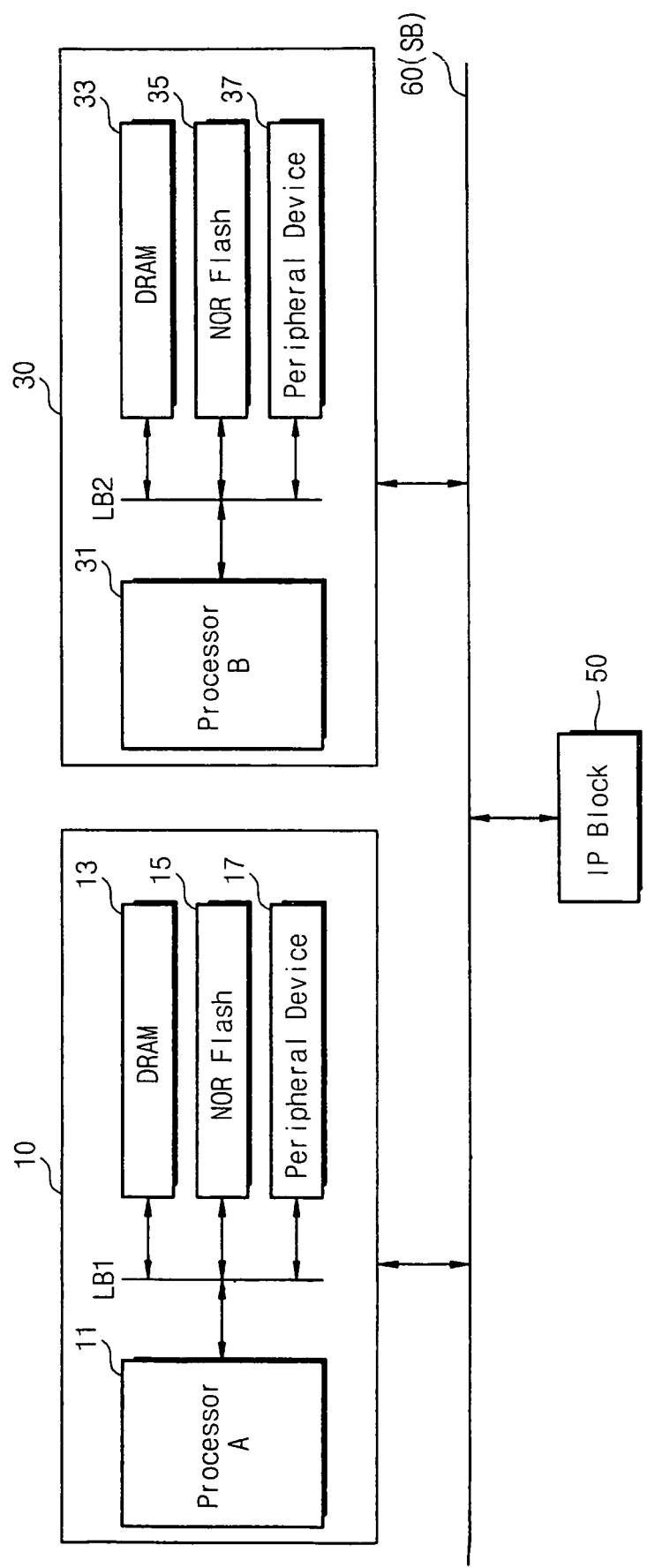
FIG. 1 is a block diagram of a conventional multi-processor system.

Detailed illustrative example embodiments of the present invention are disclosed herein. However, specific structural and functional details disclosed herein are merely representative for purposes of describing example embodiments of the present invention. Example embodiments of the present invention may, however, be embodied in many alternate forms and should not be construed as limited to the embodiments set forth herein.

Accordingly, while example embodiments of the invention are susceptible to various modifications and alternative forms, specific embodiments thereof are shown by way of example in the drawings and will herein be described in detail. It should be understood, however, that there is no intent to limit example embodiments of the invention to the particular forms disclosed, but conversely, example embodiments of the invention are to cover all modifications, equivalents, and alternatives falling within the spirit and scope of the invention. Like numbers may refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. Conversely, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 2:
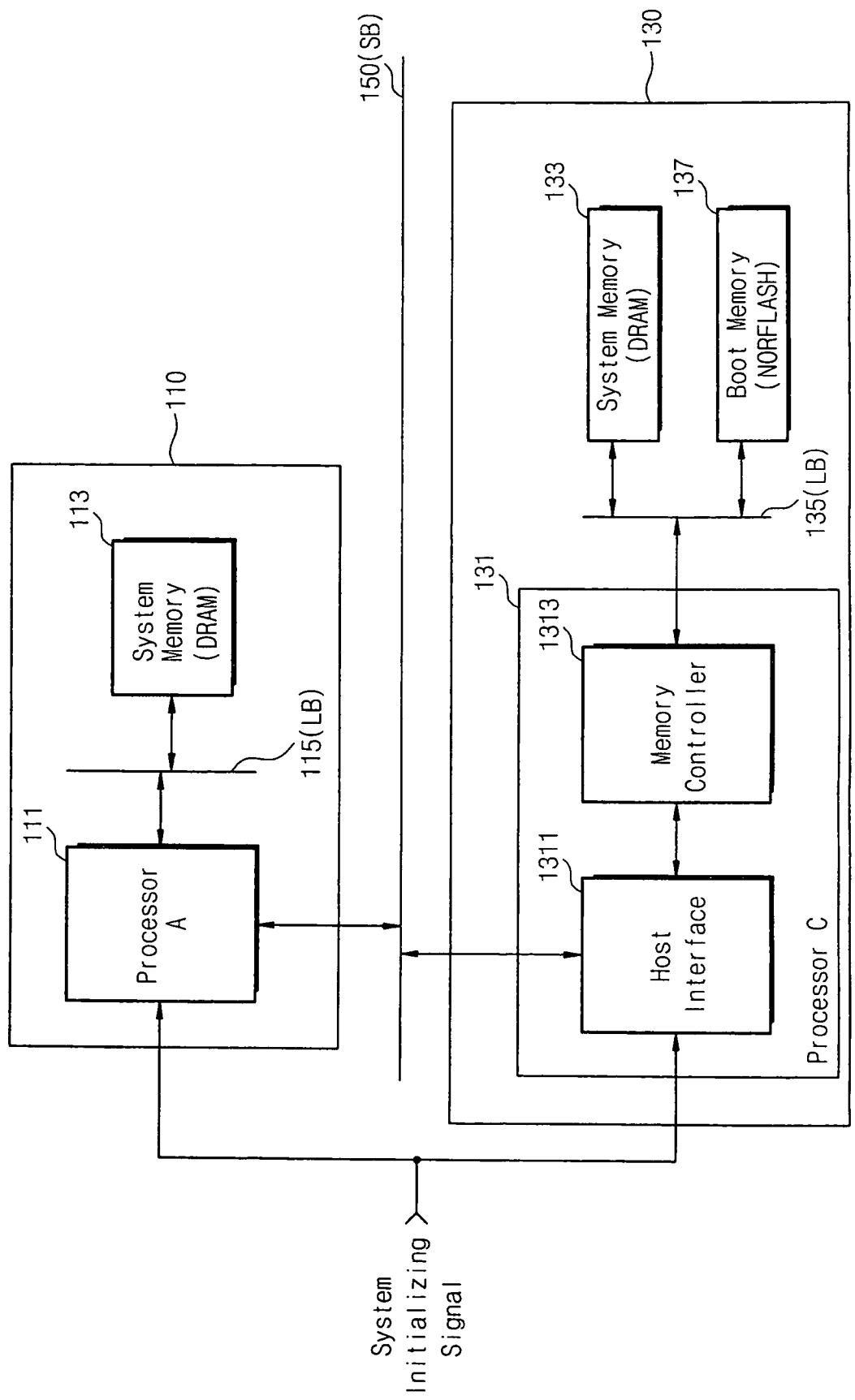
FIG. 2 is a block diagram of a multi-processor system according to an example embodiment of the present invention.

FIG. 2 is a block diagram of a multi-processor system according to an example embodiment of the present invention. In an example, the multi-processor system may be deployed within a mobile system. In the example embodiment of FIG. 2, the multi-processor system may include intellectual property (IP) blocks 110 and 130. While two IP blocks are illustrated in the example embodiment of FIG. 2, it is understood that other example embodiments of the present invention may include any number of IP blocks. The IP blocks 110 and 130 may be connected through a system bus 150. The IP blocks 110 and 130 may include processors 111 and 131 connected through each of local buses 115 and 135, and system memories 113 and 133. The system memories 113 and 133 may correspond to main memories storing data, instructions, etc., for the processors 111 and 131, respectively. In an example, the processors 111 and 131 in the IP blocks 110 and 130 may correspond to one of a modem processor for communication, an application processor for graphic user interface (GUI), a digital signal processor, etc. For example, the processor A 111 may be a graphical user interface (GUI) application processor and a processor C 131 may be a modem processor.

In the example embodiment of FIG. 2, the IP block 110 having a GUI application processor may not include a boot memory. The IP block 130 having a modem processor 131 (e.g., for receiving signals from an external source) may include a boot memory 137 in addition to the system memory 133. In an example, the boot memory 137 may be a NAND flash memory, a NOR flash memory, an EPROM, etc. The boot memory 137 in the IP block 130 may be connected to the processor C 131 (e.g., a modem processor) through the local bus 135. The processor C 131 may include a host interface 1311 and a memory controller 1313. In an example, the processor A 111 in the IP block 110 may be a host processor, and the processor C 131 in the IP block 130 may be a client processor. Thus, the host processor A 111 may receive a boot code from the boot memory 137 through the client processor C 131, as will be described in greater detail below.

In the example embodiment of FIG. 2, the processor A 111 may control and manage the system memory 113 connected to the local bus 115. Likewise, the processor C 131 may control and manage the system memory 133 and the boot memory 137 connected to the local bus 135.

In the example embodiment of FIG. 2, the local buses 115 and 135 may be used to facilitate signal transmission between the processors 111 and 131 and the memories 113, 133 and 137. The system bus 150 may be used to facilitate signal transmission between the host processor A 110 and the client processor C 131. In an example, the system bus 150 may provide a dedicated path through which the host processor A 111 may receive a corresponding boot code from the client processor C 131.

In the example embodiment of FIG. 2, the boot memory 137 may store a program (e.g., boot code) for initializing each of the IP blocks 110 and 130. Additionally, the boot memory 137 may store another program such as an OS program or data.

In the example embodiment of FIG. 2, the host interface device 1311 in the client processor C 131 may be a device exchanging signals (e.g., data and instructions) with the host processor A 111. The memory controller 1313 in the processor C 1311 may control an operation of the boot memory 137 (e.g., a NAND flash memory) and the system memory 133 of a DRAM. For example, the memory controller 1313 may read data, such as a boot code stored in the boot memory 137, and may deliver the data to the host interface 1311. Further, the memory controller 1313 may store data, such as a boot code read from the boot memory 137 through the local bus, for system initialization of the IP block 130.

Figure 3:
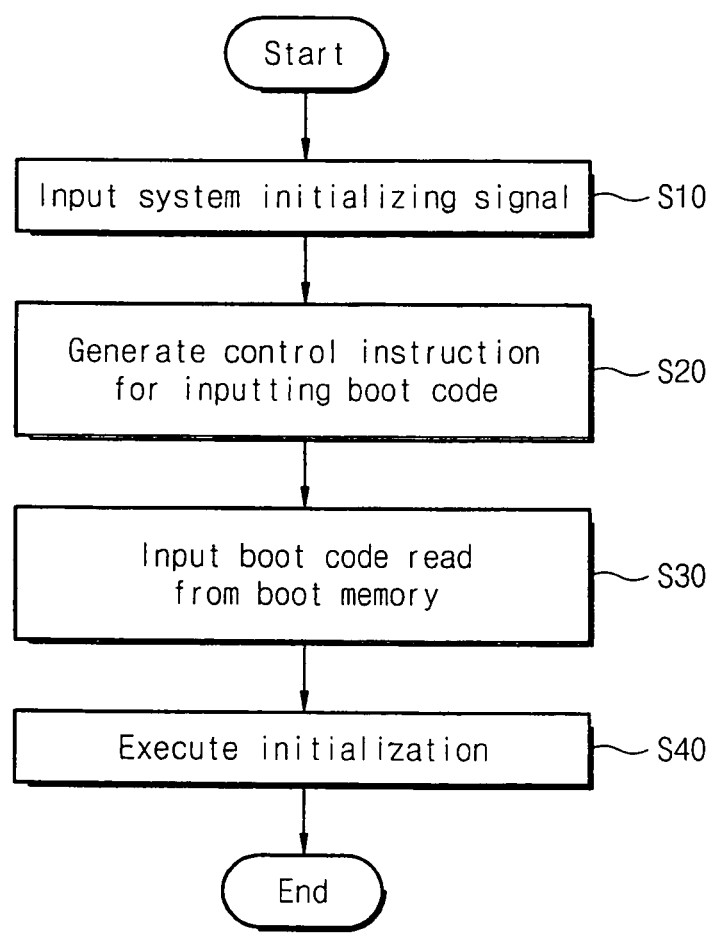
FIG. 3 is a flowchart illustrating operations performed by the multi-processor system of FIG. 2 according to another example embodiment of the present invention.

FIG. 3 is a flowchart illustrating operations performed by the multi-processor system of FIG. 2 according to another example embodiment of the present invention.

In the example embodiment of FIG. 3, if a user turns on a mobile device including the multi-processor system of the FIG. 2, each of the processors 111 and 131 in the IP blocks 110 and 130 may receive a system initializing signal (at S10) (e.g., the system initial signals received at the respective IP blocks 110 and 130 may be the same or different). In an example, the system initializing signal may include a power-up signal and a system reset signal. The host processor A 111 in the IP block 110 (e.g., which need not include an additional boot memory) may transfer a control instruction, which may be used to receive a boot code from the boot memory 137, to the client processor C 131 in response to the received system initializing signal (at S20).

In the example embodiment of FIG. 3, the memory controller 1313 in the client processor C 131 may read a corresponding boot code from the boot memory 137 based on the control instruction transferred from the host processor A 111. The memory controller 1313 may transfer the read boot code into the host interface 1311. The host interface 1311 may transfer the boot code to the host processor A 111 through the system bus 150 (at S30). The host processor A 111 may copy the inputted boot code into the system memory 113 and may execute a system initializing operation (at S40). In a further example, which may be performed alternatively to or in addition to the above example, the client processor C 131 may read a corresponding boot code from the boot memory 137 in response to the system initializing signal (at S40). The client processor 131 may copy a corresponding boot code into the system memory 133, and may execute a system initializing operation (at S40).

In another example embodiment of the present invention, referring to FIGS. 2 and 3, two or more processors may share access to a single boot memory in the multi-processor system. Accordingly, a size and manufacturing cost of a device (e.g., a mobile device) including the example multi-processor system may be reduced. For example, if at least a portion of the plurality of processors utilizes a given memory interface (e.g., a NAND flash memory interface), the given flash memory may be commonly shared as a boot memory. Boot code stored within the common boot memory may be transferred to one or more of the plurality of processes through a processor (e.g., the processor C) using the given flash memory interface.

Figure 4:
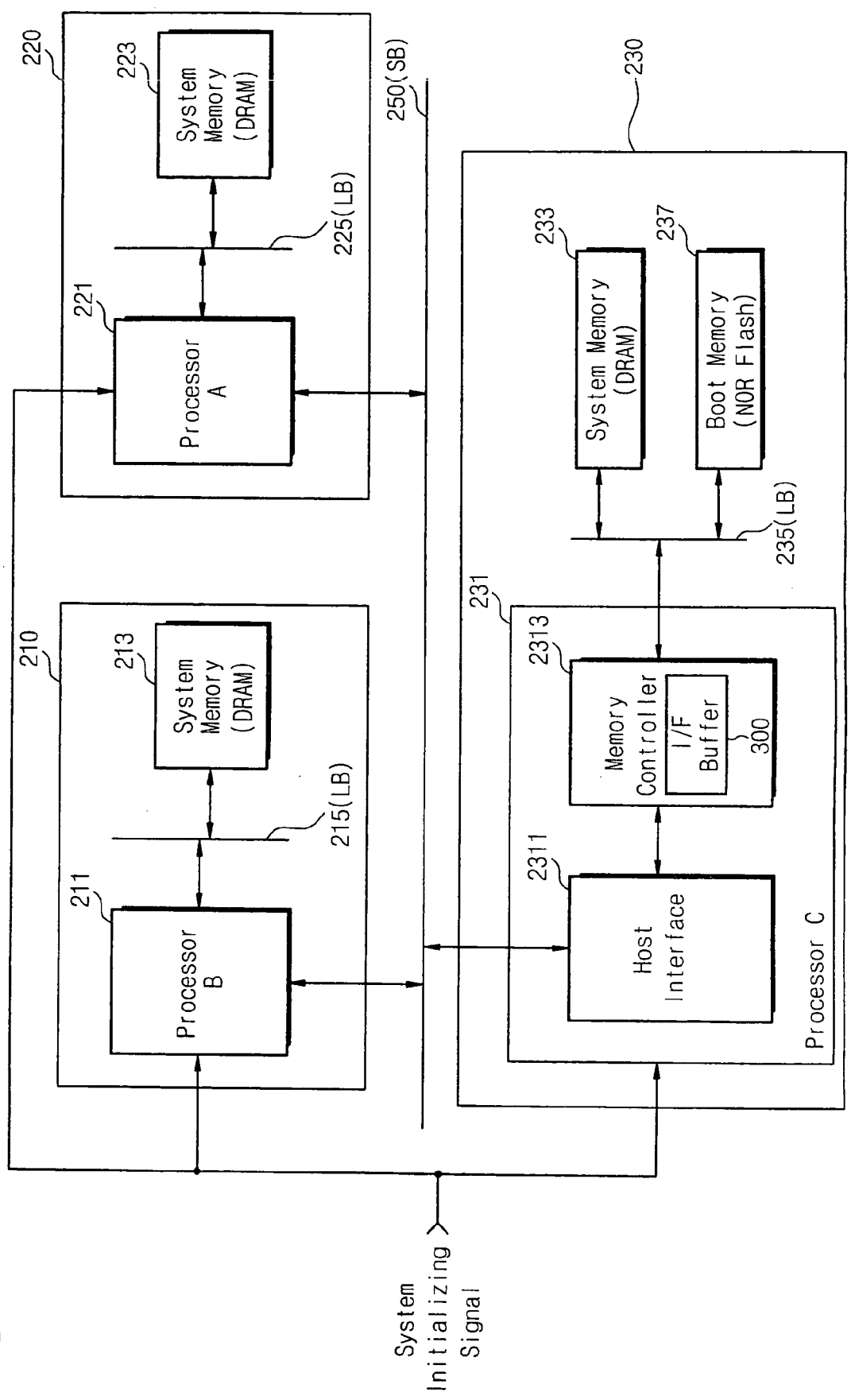
FIG. 4 is a block diagram of a multi-processor system according to another example embodiment of the present invention.

FIG. 4 is a block diagram of a multi-processor system according to another example embodiment of the present invention. In the example embodiment of FIG. 4, the multi-processor system may include IP blocks 210, 220, and 230. The IP blocks 210, 220 and 230 may be connected through a system bus 250. The IP blocks 210, 220 and 230 may include respective processors 211, 221 and 231, and respective system memories 213, 223 and 233. In an example, the system memories 213, 223 and 233 may correspond to dynamic random access memory (DRAM) devices. For example, the processor A 211 may be a GUI application processor, the processor B 221 may be a digital signal processor and the processor C 231 may be a modem processor. Processors 211, 221 and 231 may be connected to the system memories 213, 223, and 233, respectively, through the local buses 215, 225 and 235, respectively. In an example, the processors A 211 and the processor B 221 may be host processors, and the processor C 131 may be a client processor.

In the example embodiment of FIG. 4, the IP block 230 having the client processor 231 may include the boot memory 237, and the IP blocks 210 and 220 having the host processor A 211 and the processor B 221 need not include an additional boot memory. In an example, the boot memory 237 may be embodied as one of a NAND flash memory, a NOR flash memory and a EPROM. The boot memory 237 in the IP block 230 may be connected to the client processor C 230 (e.g., a modem processor) through the local bus 235. The client processor C 231 may include a host interface device 2311 and a memory controller 2313. Unlike the memory controller 1313 of the example embodiment of FIG. 2, the memory controller 2313 may further include an interface buffer 300.

In the example embodiment of FIG. 4, functions of components corresponding to those present within the example embodiment of FIG. 2 may be equivalent. Thus, a repeated description of corresponding structural elements in each of FIGS. 2 and 4 has been omitted for the sake of brevity.

FIG. 5 is a flowchart illustrating operations performed by the multi-processor system of FIG. 4 according to another example embodiment of the present invention.

In the example embodiment of FIG. 5, a user may turn on a mobile device including the multi-processor system of FIG. 5, and the host processors 211 and 221 in the IP blocks 210, 220, and 230 may each receive a system initializing signal (at S110) (e.g., the system initial signals received at the respective IP blocks 210, 220 and 230 may be the same or different). In an example, the system initializing signal may include a power-up signal and a system reset signal. The memory controller 2313 in the client processor C 231 may read a boot code corresponding to the respective host processors 211 and 221 to store the boot code in an interface buffer 300 (at S120).

In the example embodiment of FIG. 5, the client processor C 231 may read the boot code from the boot memory 237, and may concurrently generate a delay reset signal to determine an order of priority in the host processors A 211 and the host processor B 221 (at S120). Thus, the client processor C 231 may sequentially output a delay reset signal, which may delay a system reset signal by a given amount of time, to the host processors 211 and 221 (at S120). Accordingly, the respective host processors 211 and 221 may sequentially generate control instructions (e.g., instructions for receiving a boot code from a client) for the client processor 232 in response to an OR signal of a system initializing signal and a delay reset signal (at S130).

In the example embodiment of FIG. 5, the client processor C 231 may enable the interface buffer 300 in response to each sequentially-inputted control instruction. Accordingly, boot codes, which may respectively correspond to the host processor A 211 and the host processor B 221, may be output from the interface buffer 300 to the host interface 2311. The host interface 2311 may transfer the received boot codes to the host processors 211 and 221 through the system bus 250 (at S140).

In the example embodiments of FIGS. 4 and 5, the interface buffer 300 may include a plurality of buffers corresponding to the host processors 211 and 221. In an example, the client processor C 231 may enable corresponding buffers in response to control instructions from the host processor A 211 and the host processor B 221.

In the example embodiment of FIG. 5, the host processor A 211 and the host processor B 221 may copy the respectively inputted boot codes into the system memories 213 and 223, and may execute an initializing operation (at S150). In an example, the client processor C 231 may copy a boot code for initializing its own system into the system memory 233, and may execute the initializing operation.

In another example embodiment of the present invention, a plurality of processors may share a single boot memory in a multi-processor system within a given device (e.g., a mobile device). Accordingly, a size and manufacturing cost of a device (e.g., a mobile device) including the example multi-processor system may be reduced. For example, if at least a portion of the plurality of processors utilizes a given memory interface (e.g., a NAND flash memory interface), the given flash memory may be commonly shared as a boot memory. Boot code stored within the common boot memory may be transferred to one or more of the plurality of processes through a processor (e.g., the processor C) using the given flash memory interface. Further, an interface buffer may be connected to a processor reading a boot code to reduce a latency in communication with an external boot memory.

Example embodiments of the present invention being thus described, it will be obvious that the same may be varied in many ways. For example, while the example embodiments of the present invention are generally described with respect to mobile devices, it is understood that other example embodiments of the present invention may be directed to any type of device (e.g., stationary devices such as desktop computers). Further, while above-described example embodiments of the present invention have been generally described with respect to NAND flash memory, it is understood that other example embodiments of the present invention may be employed with any well-known type of memory.

Such variations are not to be regarded as a departure from the spirit and scope of example embodiments of the present invention, and all such modifications as would be obvious to one skilled in the art are intended to be included within the scope of the following claims.

What is claimed is:

1. A processing device, comprising:
a processor configured to connect to a system bus of a multi-processor system; an interface buffer configured to receive via a local bus a first boot code upon receipt of an activating signal from the processor, wherein the processor is configured to activate the interface buffer to access a second boot code via the local bus upon receipt of an instruction from a processor of another processing device and to transfer the second boot code to the second processing device via the system bus.

2. The processing device of claim 1, wherein the processor includes the interface buffer, and the processor is part of a first processing device.

3. The processing device of claim 1, wherein a system memory is included in the another processing device and the system memory is configured to store the second boot code.

4. The processing device of claim 1, further comprising a host interface to communicate with the another processing device.

5. The processing device of claim 1, wherein the instruction is configured to activate the interface buffer.

6. The processing device of claim 1, wherein the first boot code and the second boot code are stored in a boot memory.

7. The processing device of claim 6, wherein the boot memory is connected to the local bus.

8. The processing device of claim 1, wherein a system memory is included in the another processing device and the system memory is configured to store the boot code.

9. The processing device of claim 1, further comprising a host interface to communicate with the another processing device.

10. A multi-processor system, comprising:
A first intellectual property (IP) block including a first processor and a second IP block including a second processor, the first processor and the second processor configured to connect to a system bus to receive a corresponding first boot code or a corresponding second boot code upon issuing an instruction configured to control an interface buffer to access the first boot code or the second boot code from a shared boot memory.

11. The system according to claim 10, wherein the shared boot memory is included in either the first IP block or the second IP block.

12. The system according to claim 10, wherein either the first IP block or the second IP block includes an interface buffer.

13. The system according to claim 10, wherein the shared boot memory is a NOR flash.

14. The system according to claim 10, wherein the shared boot memory is included in a third IP block connected to the system bus.

15. The system according to claim 14, wherein the third IP block includes a third processor and an interface buffer.

16. The system according to claim 10, wherein the instruction is further configured to activate an interface buffer.

17. A multi-processor system, comprising:
A first intellectual property (IP) block including a first processor; and
a second IP block including a second processor, a boot memory storing a plurality of boot codes, and an interface buffer configured to store a boot code read from the boot memory, wherein the second processor is configured to read a boot code from the boot memory corresponding to the second IP block to initialize the second IP block, wherein
the first IP block and the second IP block are connected via a system bus, and the first IP block is configured to issue an instruction to effect retrieval of a boot code corresponding to the first IP block from the boot memory via the interface buffer.

18. The system according to claim 17, wherein the boot code corresponding to the first IP block is received by the first IP block via the system bus.

19. The system according to claim 17, wherein the instruction is configured to activate the interface buffer.

20. The system according to claim 17, further including a third IP block connected to the first and second IP blocks via one of a system bus or a local bus, the third IP block is configured to issue an instruction to effect retrieval of a boot code corresponding to the third IP block from the boot memory via the interface buffer.

21. A processing device, comprising:
a processor and an interface buffer, the processor configured to connect to a system bus of a multi-processor system and to activate the interface buffer, the interface buffer configured to store a boot code, wherein the processor is further configured to access the boot code upon receipt of an instruction from a processor of another processing device and to transfer the boot code to the another processing device via the system bus.

22. A processing device, comprising:
a first processor and a memory, the first processor configured to connect to a system bus of a multi-processor system, to issue an instruction to access a boot code from a buffer in another processing device, and to receive the boot code via the system bus, wherein the first processor is further configured to boot the processing device using the boot code.

23. The processing device of claim 22, wherein the another processing device includes a second processor configured to activate the buffer upon receipt of the instruction.

24. The processing device of claim 22, wherein the another processing device includes a host interface configured to interface with the first processor.

25. The processing device of claim 22, wherein the memory is configured to store the boot code.

* * * * *